United States Patent [19]

Schmitt et al.

[11] Patent Number: 4,594,579

[45] Date of Patent: Jun. 10, 1986

[54] APPARATUS FOR DIGITALLY SUBDIVIDING ANALOG PERIODIC SIGNALS

[75] Inventors: Walter Schmitt, Traunreut; Franz Ritz, Ubersee, both of Fed. Rep. of Germany

[73] Assignee: Dr. Johannes Heidenhain GmbH, Traunreut, Fed. Rep. of Germany

[21] Appl. No.: 459,374

[22] Filed: Jan. 20, 1983

[30] Foreign Application Priority Data

Jan. 26, 1982 [DE] Fed. Rep. of Germany ....... 3202356

[51] Int. Cl.$^4$ ...................... H03K 13/02; G08C 19/16
[52] U.S. Cl. .............................. 340/347 SY; 318/605; 340/347 M
[58] Field of Search ................ 340/347 SY, 347 AD, 340/347 CC, 347 M; 318/661, 605

[56] References Cited

U.S. PATENT DOCUMENTS

| | | |
|---|---|---|
| 3,594,783 | 7/1971 | Bullock . |
| 3,634,838 | 1/1972 | Granqvist ................. 340/347 SY X |
| 3,914,760 | 10/1975 | Logue ........................... 340/347 AD |
| 4,134,106 | 1/1979 | Hungerford .................. 340/347 SY |
| 4,156,234 | 5/1979 | Molnar ......................... 340/347 SY |
| 4,225,931 | 9/1980 | Schwefel . |
| 4,486,845 | 12/1984 | Duckworth .............. 340/347 SY X |

FOREIGN PATENT DOCUMENTS

PS407569 12/1963 Fed. Rep. of Germany .
2729697 7/1977 Fed. Rep. of Germany .

*Primary Examiner*—T. J. Sloyan

*Attorney, Agent, or Firm*—Willian, Brinks, Olds, Hofer, Gilson & Lione Ltd.

[57] ABSTRACT

An incremental length measuring instrument generates analog scanning signals $S_1$, $S_2$ with a certain period P which are applied to a comparator in conjunction with two reference signals $R_{S1}$, $R_{S2}$. The measuring instrument causes the scanning signals $S_1$, $S_2$ to change as a function of relative displacement to two components of the measuring instrument. The comparator generates an analog control signal $S_D$ as a function of the difference of the momentary values of the signals applied as inputs to the comparator. The analog control signal $S_D$ is applied as an input to a signal generator which includes an oscillator. The oscillator generates a number of pulses in dependence on the momentary value of the analog control signal $S_D$. These pulses cause the reference signals $R_{S1}$, $R_{S2}$ to be modified by the signal generator. In addition, the pulses are fed in a direction dependent manner into an incremental counter which includes a numerical display. The counter maintains a count which is displayed as an indication of the relative position of the two components of the measuring instrument. The reference signals $R_{S1}$, $R_{S2}$ are modified by the pulses generated by the oscillator until their momentary values correspond to the momentary values of the scanning signals $S_1$, $S_2$. When this occurs, the difference between these momentary values is zero and the comparator no longer delivers the control signal $S_D$, thereby causing the pulse generation by the oscillator to cease. When this happens, the displayed counter state on the incremental counter and the reference signals $R_{S1}$, $R_{S2}$ remain in their momentary states.

18 Claims, 2 Drawing Figures

APPARATUS FOR DIGITALLY SUBDIVIDING ANALOG PERIODIC SIGNALS

BACKGROUND OF THE INVENTION

This invention relates to an apparatus for subdividing analog periodic signals, such as analog scanning signals or measurement signals which are generated by an incremental measuring instrument which scans a structured division, such as a grid scale, to measure the relative position of a first object with respect to a second object.

The resolving capacity of such measuring instruments is determined by the grid constant of the division used. A number of different approaches have been employed in the prior art to achieve smaller digital steps than the grid constant of the division in use, particularly by electronic processing of measurement signals generated by incremental measuring instruments.

One approach to such interpolation or subdivision of measurement signals is shown in Swiss Pat. No. 407,569. In this approach, the analog measurement signals, which are phase shifted with respect to one another, are applied to a resistance chain that includes a series of adjustable potentiometers. By tapping the potentiometers, a plurality of secondary signals can be generated from the primary measurement signals. Each of these secondary signals lies between the primary signals, and thus can be used to form an interpolated position value by means of a respective trigger circuit. In this interpolation system a large number of trigger circuits are required.

Another approach of the prior art is disclosed in West German DE-OS No. 27 29 297, which proposes the calculation of interpolation values with the aid of a micro-computer from digitized analog signals corresponding to the analog measurement signals. In this approach, the computing time of the micro-computer determines the maximum speed of movement which can be used with the measuring instrument.

SUMMARY OF THE INVENTION

The present invention is directed to an apparatus for subdividing periodic analog signals generated by means such as an incremental measuring instrument. The apparatus of this invention is relatively simply attached to the analog signal generating means, and it can be used to follow quickly changing analog signals accurately. Furthermore, accurate subdivision values are provided, even when high subdivision factors are used. In this way, the apparatus of this invention provides a high level of protection against erroneous interpolation values or counting errors.

According to this invention, an apparatus is provided in combination with means for generating a periodic analog signal having a period P. This apparatus includes a signal generator which comprises means for generating an analog reference signal having a period P, and a comparator which is responsive to the analog signal and the reference signal, and which includes means for generating an analog control signal indicative of the relative amplitudes of the analog and reference signals. An oscillator is provided which includes means for generating a series of pulses, the number of which varies as a function of the control signal. Furthermore, means are provided in the signal generator for modifying the reference signal as a function of the series of pulses such that a preselected number of the pulses causes the reference signal to cycle through a full period, and thereby determines a subdivision factor for the analog signal. Further features of the invention are set forth in the attached dependent claims.

The apparatus of this invention provides the important advantage that accurate interpolation is provided with a system that is relatively inexpensive to manufacture. The apparatus of this invention provides a high level of accuracy in the evaluating of analog signals of a selected frequency. Furthermore, the subdivision factor provided by the apparatus of this invention can readily be varied as needed.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
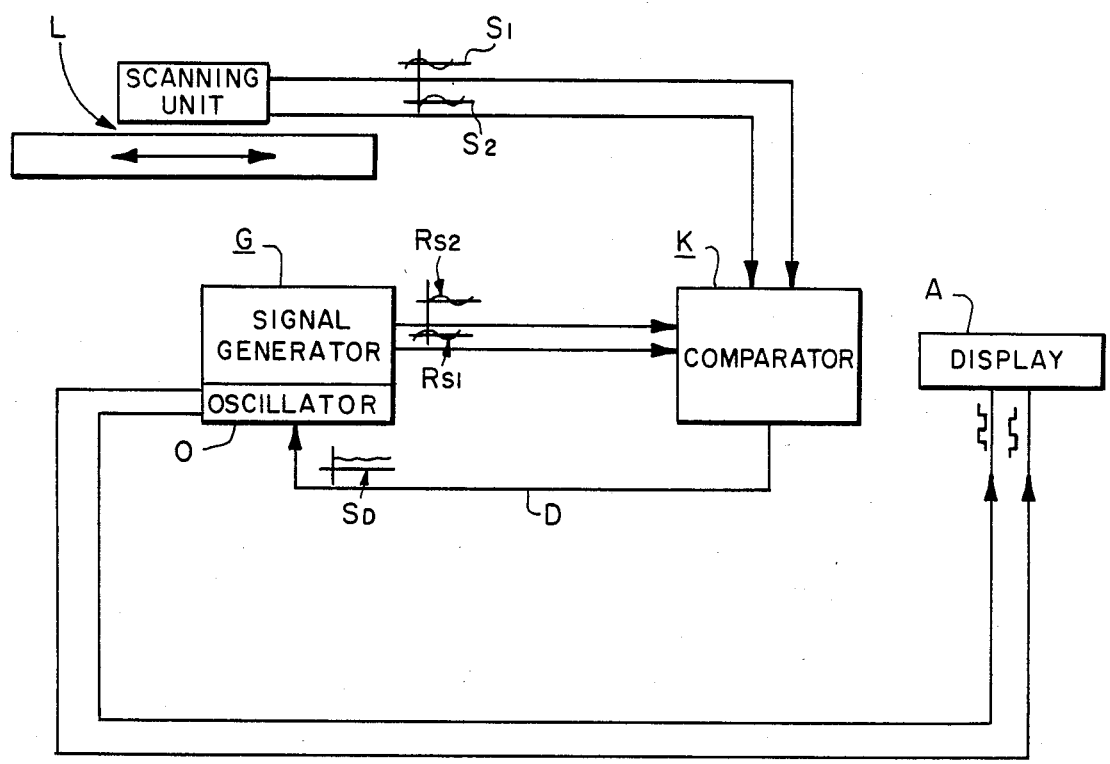
FIG. 1 is a block diagram of a path measuring instrument which incorporates a presently preferred embodiment of this invention.

Turning now to the drawings, FIG. 1 shows an incremental length measuring device L which generates two scanning signals $S_1$ and $S_2$ as a function of the movements of a scanning unit with respect to a grid scale. These two scanning signals $S_1$ and $S_2$ are applied as inputs to a comparator K. The comparator K is connected to a signal generator G which generates reference signals $R_{S1}$ and $R_{S2}$ which are also applied as inputs to the comparator K. The reference signals $R_{S1}$ and $R_{S2}$ of this embodiment are analog signals which are generated digitally, as will be explained below in conjunction with FIG. 2. The comparator K operates to compare each of the scanning signals $S_1$, $S_2$ with the respective one of the reference signals $R_{S1}$ and $R_{S2}$, and to generate an analog control signal $S_D$ in response to the outcome of this comparison. The control signal $S_D$ is applied over a control line D to an oscillator O. This oscillator O operates to generate a sequence of pulses, the number of which is controlled by the control signal $S_D$. These control pulses are applied to the signal generator G to modify the reference signals $R_{S1}$, $R_{S2}$. The pulses are also fed to an incremental counter which includes a numerical display A.

Figure 2:
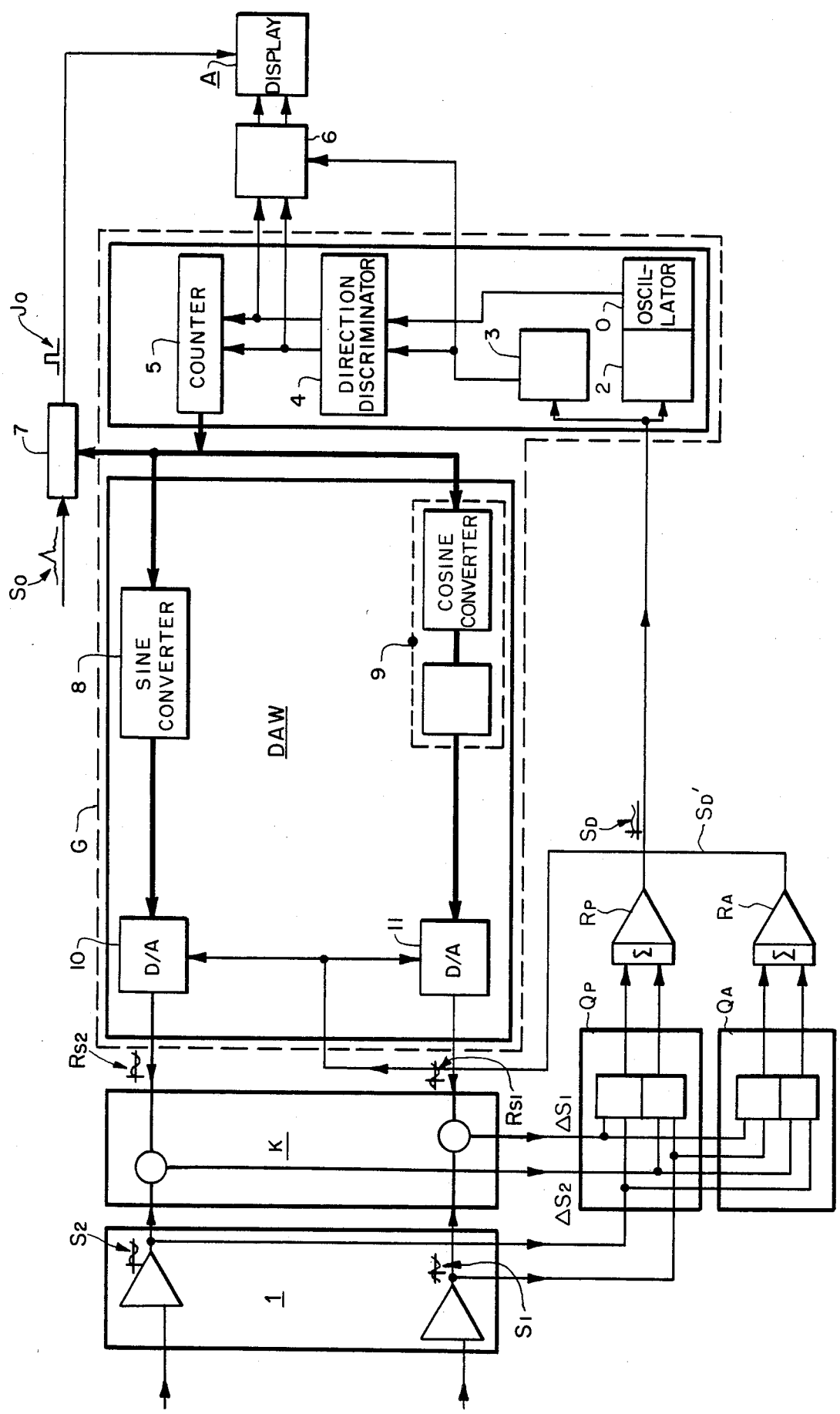
FIG. 2 is a detailed block circuit diagram of a portion of the embodiment of FIG. 1.

Turning now to FIG. 2, the comparator K, signal generator G and oscillator O are there shown in greater detail. As is conventional for a wide range of incremental measuring instruments, the analog scanning signals $S_1$ and $S_2$ are phase shifted through a phase angle of 90 degrees in order to enable the direction of counting to be determined. These scanning signals $S_1$, $S_2$ are amplified in a scanning signal amplifier 1. The amplified analog scanning signals $S_1$ and $S_2$ are applied to the comparator K, in which they are compared with respective ones of the analog reference signals $R_{S1}$, $R_{S2}$ with respect to their momentary amplitudes.

The amplified scanning signals $S_1$ and $S_2$ are also applied as inputs into electronic components $Q_P$ and $Q_A$. These electronic components $Q_P$ and $Q_A$ also receive as inputs two difference signals $\Delta S_1$ and $\Delta S_2$. These difference signals $\Delta S_1$, $\Delta S_2$ are generated by the comparator K as a result of the comparison between the scanning signals S₁, S₂ and the reference signals $R_{S1}$ and $R_{S2}$, respectively. The electronic components $Q_P$ and $Q_A$ process these four input signals in order to carry out a quadrant evaluation of the signals. The electronic components $Q_P$ and $Q_A$ determine in which quadrant the determined difference between the scanning signals S₁ and S₂ and the respective reference signals $R_{S1}$ and $R_{S2}$ arises, and with what algebraic sign (+ or −) a particular difference amount must be acted upon. In each case, the quadrant evaluated signals are applied to a respective regulating amplifier for phase $R_P$ and for amplitude $R_A$, which generate control signals $S_D$ for phase and $S_D'$ for amplitude, respectively. The following formulas define the manner in which $S_D$ and $S_D'$ are determined:

$$S_D = S_1 \cdot \Delta S_2 + S_2 \cdot \Delta S_1;$$

$$S_D' = S_1 \cdot \Delta S_1 + S_2 \cdot \Delta S_2.$$

The control signal $S_D$ is applied to the signal generator G as an input. The control signal $S_D$ is evaluated in the signal generator G by components 2 and 3 to determine information, such as the magnitude and polarity of the control signal $S_D$. The component 2 applies a voltage indicative of the magnitude of the control signal $S_D$ to the oscillator O. The component 3 applies a signal indicative of the polarity of the control signal $S_D$ as an input to a direction discriminator 4. The oscillator O generates a series of digital pulses in response to the magnitude of the control signal $S_D$, which pulses are also applied as inputs to the direction discriminator 4. The direction discriminator 4 operates to generate output pulses on one of two output terminals, in accordance with the direction of counting indicated by the component 3. These output pulses of the direction discriminator 4 are applied to the forward and backward counting inputs, respectively, of a counter 5. In addition, these outputs are applied to a standstill logic device 6, which also receives direction information from the component 3. The device 6 is operative to prevent changes of only a single pulse from reaching the display A after a reversal of the counting directing (as from forward counting to reverse counting for example), such that only changes greater than two counting pulses are passed after such a reversal. In this way, jitter introduced by the phase regulating circuit of ±1 counting pulse is isolated from the display A. Pulses passing through the standstill logic device 6 are counted in an incremental counter which includes a numerical display A which operates to display the measured position.

The measured position displayed by the display A is continuously modified in response to the scanning signals S₁, S₂, which evolve in time as the two relatively movable components of the length measuring instrument L are moved. In this embodiment, the scanning signals S₁, S₂ are constantly compared with respective ones of the reference signals $R_{S1}$ and $R_{S2}$ in order to provide both counting of cycles of the scannning signals S₁, S₂ as well as the determination of interpolation values.

The oscillator O generates a series of digital pulses, as explained above. These pulses are also counted in an up-down counter 5. In this preferred embodiment, the period of the analog scanning signal S₁, S₂ is to be subdivided by a factor of 100. For this reason, the subdivision factor is established by the counter 5 at N=100. That is, 100 pulses from the oscillator O are required to cycle the counter 5 through one complete cycle.

The signal generator G which generates the reference signals $R_{S1}$ and $R_{S2}$ applies the reference signals $R_{S1}$, $R_{S2}$ continuously to the respective inputs of the comparator K. The signal generator G is arranged such that each of the reference signals $R_{S1}$ and $R_{S2}$ cycles through a complete period when the counter 5 counts 100 pulses generated by the oscillator O. In order to ensure this result, the signal generator G includes a digital to analog converter DAW, which is constructed in such a way that it generates an output analog signal which is dependent on the binary input data supplied by the counter 5. In this preferred embodiment, the digital to analog converter DAW includes a sine converter 8 and a cosine converter 9, which serve to produce output signals proportional to the sine and cosine, respectively, of the numbers stored in the counter 5. The output signals generated by the sine and cosine converters 8,9 are applied to respective digital to analog converters 10,11, which generate the reference signals $R_{S2}$, $R_{S1}$, respectively.

As explained above, the number of pulses generated by the oscillator O is dependent upon the control signal $S_D$ that is generated as a result of the comparison between the scanning signals S₁ and S₂ and the respective reference signals $R_{S1}$, $R_{S2}$. The momentary values of the reference signals $R_{S1}$, $R_{S2}$ are therefore dependent on the result of the comparison between the scanning signals S₁, S₂ and the reference signals $R_{S1}$, $R_{S2}$.

The function and operation of the circuit shown in block diagram form in FIG. 2 can now be described as follows. For the purposes of this explanation, it will be assumed that a movable part of the measuring instrument L has been moved through a selected interval, and that the values of the analog signals S₁, S₂ applied as inputs to the comparator K do not agree with the momentary values of the reference signals $R_{S1}$, $R_{S2}$ on the other inputs of the comparator K. The comparison between S₁ and $R_{S1}$ and S₂ and $R_{S2}$, respectively, therefore generates difference signals $\Delta S_1$ and $\Delta S_2$ which are processed in the components $Q_P$ and $Q_A$ in such a way that in the regulating amplifier $R_P$ there is generated a phase control signal $S_D$ and in the regulating amplifier $R_A$ is generated an amplitude control signal $S_D'$. The two control signals $S_D$, $S_D'$ correspond to and vary as a function of the difference between the momentary values of the signals S₁, $R_{S1}$ and S₂, $R_{S2}$.

The magnitude of the control signal $S_D$ which is applied as a voltage to the oscillator O causes the oscillator O to generate a number of pulses. In this embodiment, the number of pulses generated by the oscillator O corresponds to the distance (in units of one-one hundredth of the length of the period P) through which the movable part of the measuring arrangement L was moved, since for a complete signal period 100 pulses of the oscillator O are required.

These pulses generated by the oscillator O are, after direction determination, applied (1) to the numerical incremental counter of numerical display A which indicates the total number of pulses and (2) to the counter 5. The counter 5 maintains a count of the pulses generated by the oscillator O and applies this count in the form of binary information to the digital to analog converter DAW. In response, the digital to analog converter DAW generates revised values for the two reference signals $R_{S1}$ and $R_{S2}$ which are more nearly equal to the scanning signals S₁, S₂, respectively, applied to the other inputs of the comparator K. Because of the revision to the reference signals $R_{S1}$, $R_{S2}$, $R_{S1}$ is equal to the scanning signal $S_1$ and $R_{S2}$ is equal to the scanning signal $S_2$. That is, $\Delta S_1$ and $\Delta S_2$ are both equal to zero. Accordingly, the control signal $S_D$ goes to zero and the oscillator O is prevented from generating further pulses. The process described above goes on continuously so that the display result displayed in the display A constantly corresponds to the measured position of the two parts of the measuring instrument L. The resolution of this displayed result is in this preferred embodiment 100 times greater than the grid constant of the incremental grid included in the measuring instrument L.

The regulating amplifier $R_A$ for amplitude generates a comparison dependent control signal $S_D'$ for the readjustment of the amplitudes of the reference signals $R_{S1}$, $R_{S2}$. This control signal $S_D'$ is applied to the digital to analog converter DAW and acts to modify the reference voltages applied to the converters 10,11 in order to equate the momentary values of the amplitudes of the reference signals $R_{S1}$, $R_{S2}$ with the momentary values of the amplitudes of the scanning signals $S_1$, $S_2$. The control signal $S_D'$ is generated as a result of a quadrant evaluation carried out in the component $Q_A$, as explained above.

The reference position for a measurement is obtained in a known manner by a reference mark (not shown). A reference signal $S_0$ derived from this reference mark in a known manner by the measuring instrument L is applied as an input to an electronic component 7 which links the signals $S_0$ with the binary data stored in the counter 5. The electronic component 7 also acts to decode the reference signal $S_0$ and to generate in response thereto a reference pulse $J_0$ which is applied to the incremental counter included in the numerical display A. The counter responds to the reference pulse $J_0$ in any one of a number of known manners, as for example by setting the counter to zero or to any arbitrarily selected value in response to the reference pulse $J_0$. Effects of the transit times of the primary scanning signals $S_1$ and $S_2$ which in dynamic measurements can result in faulty measurements and can arise, for example, in the scanning signal amplifier 1, can be compensated for via transit time compensating components included in the digital to analog converter DAW, so that the scanning signals $S_1$, $S_2$ and the reference signals $R_{S1}$, $R_{S2}$ are applied to the comparator K with equal transit times.

Similarly, the comparator K can be placed upstream of the scanning signal amplifier 1 so that the comparison made in the comparator K between the signals $S_1$, $R_{S1}$ and $S_2$, $R_{S2}$ is not dependent on the transit time of the signals $S_1$, $S_2$ in the amplifier 1.

The following details are provided merely by way of example to explain the types of components that can be used to construct the embodiment of FIG. 2: components $Q_A$, $Q_P$ can be analog multipliers such as Motorola MC1496; comparator K can be a comparator of resistances in which $\Delta S_1$ and $\Delta S_2$ are both zero in the balanced state; components $R_P$, $R_A$, and 1 can be operational amplifiers such as National Semiconductor LM 348; component 2 can be an operational amplifier such as National Semiconductor LM 348 circuited to provide an output which is the absolute value of the input; component 3 can be a voltage comparator such as National Semiconductor LM 339 circuited to provide an output indicative of the polarity of the input; oscillator 0 can be a voltage to frequency converter such as Raytheon 4151; counter 5 can be an up-down counter such as Texas Instruments SN 74192; converter 8 and 9 can be PROMS such as Texas Instruments TBP 28 L 22; components 10,11 can be digital to analog converters such as National Semiconductor DAC 0800.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

We claim:

1. In combination with means for generating at least two periodic analog signals having a period P, a system for subdividing the periodic analog signals, said systems comprising:
    a signal generator which comprises means for generating one respective periodic analog reference signal for each analog signal, each respective reference signal having the period P;
    a comparator responsive to the at least two analog signals and the at least two reference signals, said comparator comprising means for generating an analog control signal indicative of the momentary amplitude differences between the analog signals and the reference signals;
    an oscillator responsive to the analog control signal, said oscillator comprising means for generating a series of pulses, the number of which varies as a function of the control signal;
    means, included in the signal generator, for shifting the phase of the reference signals as a function of the series of pulses to cause the phase of the reference signals to correspond to the phase of the respective analog signals, such that a preselected number of the pulses causes the reference signals to cycle through a full period P and thereby determines a subdivision factor of the full period P for the analog signals; and
    means for maintaining a continuous digital count of the series of pulses as a digital indication of the phase angle of the periodic analog signals.

2. The invention of claim 1 wherein the means for maintaining a count comprises an up-down counter operative to count the series of pulses; and
    wherein said signal generator comprises a digital to analog converter responsive to the count stored in the counter to generate the at least two reference signals.

3. The invention of claim 2 wherein the signal generator further comprises a sine converter having an input coupled to the counter and an output coupled to the digital to analog converter such that at least one of the reference signals is generated as a function of the sine of the count stored in the counter.

4. The invention of claim 2 wherein the signal generator further comprises a cosine converter having an input coupled to the counter and an output coupled to the digital to analog converter such that at least one of the reference signals is generated as a function of the cosine of the count stored in the counter.

5. The invention of claim 1 wherein the means for generating an analog signal generates first and second analog signals, wherein the means for generating a reference signal generates first and second reference signals, and wherein the comparator comprises means for generating first and second difference signals, each indicative of the momentary amplitude difference between one of the first and second analog signals and the corresponding one of the first and second reference signals.

6. The invention of claim 5 wherein the comparator further comprises:
means for evaluating the difference signals and the analog signals with respect to their quadrant position and for generating a phase proportional control signal and an amplitude proportional control signal;
means for supplying the phase proportional control signal to the oscillator; and
means for adjusting the momentary amplitude of the reference signals in response to the amplitude proportional control signal to match the momentary amplitude of the reference signals to the momentary amplitude of the analog signals in the event of a disparity therebetween after the phases of the reference and analog signals have been brought into correspondence.

7. The invention of claim 5 further comprising an amplifier coupled to receive at least one of the first and second difference signals as an input.

8. The invention of claim 1 further comprising means for compensating the transit time of the analog signals prior to the comparison of the analog and reference signals by the comparator.

9. The invention of claim 1 wherein the means for generating at least two periodic analog signals comprises a position measuring system of the type comprising a periodically structured division and means for scanning the division to generate the periodic analog signals such that the phase of the periodic analog signals varies in accordance with the position of the scanning means with respect to the division.

10. The invention of claim 9 wherein the invention further comprises:
means for utilizing the digital count as a digital measure of the phase of the periodic analog signals to indicate intermediate points in the period of the periodic analog signals.

11. The invention of claim 10 wherein the utilizing means comprises visual display means for displaying the digital count.

12. The invention of claim 11 further comprising:
means for setting the display to a predetermined value in response to a reference signal derived from a reference mark.

13. In combination with a position measuring system of the type comprising a periodically structured division and means for scanning the division to generate first and second path dependent, periodic analog signals, an improved arrangement for subdividing the periodic analog signals comprising:
a signal generator comprising means for generating first and second periodic reference signals, each having a period corresponding to a respective one of the analog signals;
a comparator, responsive to the analog signals and the reference signals, for comparing the first analog and reference signals and the second analog and reference signals and for generating in response thereto an analog control signal indicative of the momentary amplitude differences between the analog signals and the respective reference signals;
an oscillator, responsive to the analog control signal, said oscillator comprising means for generating a series of pulses, the number of which varies as a function of the control signal; and
means, included in the signal generator, for shifting the phase of the reference signals as a function of the series of pulses to cause the phase of the reference signals to correspond to the phase of the respective analog signals, such that a prescribed number of the pulses causes the reference signals to cycle through a full period and thereby determines a subdivision factor of the full period for the analog signals.

14. The invention of claim 13 further comprising:
means for maintaining a continuous count of the series of pulses as an indication of the phase angle of the analog signals.

15. The invention of claim 14 wherein the means for maintaining a count comprises an up-down counter operative to count the series of pulses, and wherein said signal generator comprises first and second digital to analog converters responsive to the count stored in the counter to generate the first and second reference signals, respectively.

16. The invention of claim 15 wherein the signal generator further comprises:
a sine converter having an input coupled to the counter and an output coupled to the first digital to analog converter such that the first reference signal is generated as a function of the sine of the count stored in the counter; and
a cosine converter having an input coupled to the counter and an output coupled to the second digital to analog converter such that the second reference signal is generated as a function of the cosine of the count stored in the counter.

17. The invention of claim 13 wherein the comparator comprises means for generating first and second difference signals, each indicative of the momentary amplitude difference between one of the analog signals and the corresponding one of the reference signals.

18. The invention of claim 17 wherein the comparator further comprises:
means for evaluating the difference signals and the analog signals with respect to their quadrant position and for generating a phase proportional control signal and an amplitude proportional control signal;
means for supplying the phase proportional control signal to the oscillator; and
means for adjusting the momentary amplitude of the reference signal in response to the amplitude proportional control signal to match the momentary amplitude of the reference signal to the momentary amplitude of the analog signal in the event of a disparity therebetween after the phases of the reference and analog signals have been brought into correspondence.

* * * * *

UNITED STATES PATENT AND TRADEMARK OFFICE
CERTIFICATE OF CORRECTION

PATENT NO.   : 4,594,579

DATED        : June 10, 1986

INVENTOR(S)  : Walter Schmitt et al.

It is certified that error appears in the above-identified patent and that said Letters Patent is hereby corrected as shown below:

IN THE DETAILED DESCRIPTION OF
THE PRESENTLY PREFERRED EMBODIMENTS

In column 5, line 68, please delete "converter" and substitute therefor --converters--.

Signed and Sealed this

First Day of November, 1988

Attest:

DONALD J. QUIGG

Attesting Officer

Commissioner of Patents and Trademarks